UNITED STATES PATENT OFFICE.

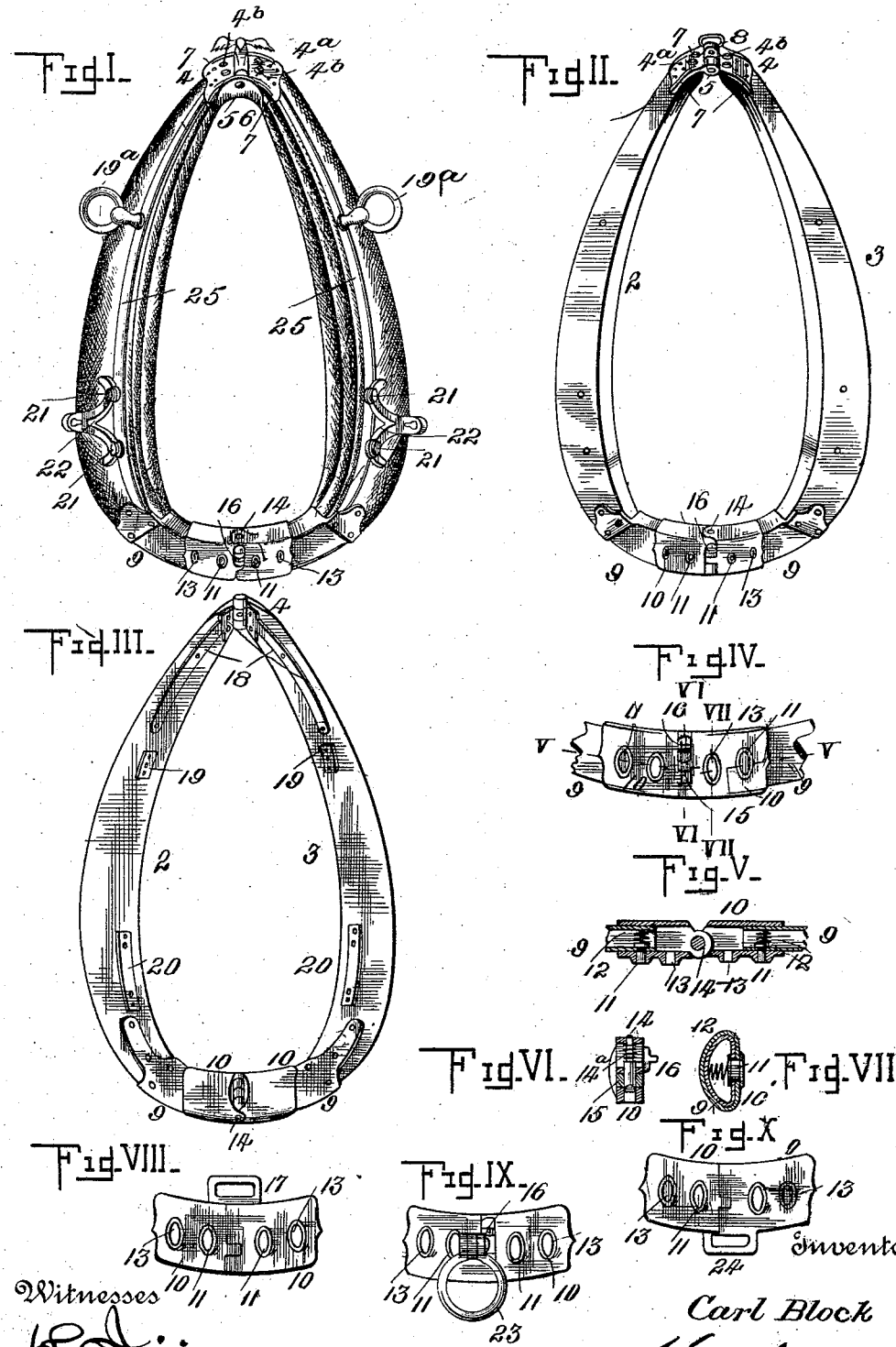

CARL BLOCK, OF ST. LOUIS, MISSOURI, ASSIGNOR TO THE HAMELESS COLLAR COMPANY, OF MISSOURI.

HORSE-COLLAR.

SPECIFICATION forming part of Letters Patent No. 542,218, dated July 2, 1895.

Application filed August 16, 1894. Serial No. 520,439. (No model.)

*To all whom it may concern:*

Be it known that I, CARL BLOCK, of the city of St. Louis, in the State of Missouri, have invented a certain new and useful Improvement in Horse-Collars, of which the following is a full, clear, and exact description, reference being had to the accompanying drawings, forming part of this specification.

My invention relates to an improvement in that class of horse-collars that combine collar and hames in one, the two sections of the collar being suitably hinged together at the top, and provided with a lock that secures the lower ends of the sections; and my invention consists in features of novelty hereinafter fully described, and pointed out in the claim.

Figure I is a front view of the finished collar. Fig. II is a front view of the hames portions of the collar. Fig. III is a rear view of the device, as shown in Fig. II. Fig. IV is a front elevation of the lock. Fig. V is a longitudinal section through the lock, taken on line V V, Fig. IV. Fig. VI is a cross-section taken on line VI VI, Fig. IV. Fig. VII is a cross-section taken on line VII VII, Fig. IV. Fig. VIII is a front elevation of the lock with a loop on the upper end of the lock-pin. Fig. IX is a similar view to Fig. VIII, with a ring secured to the front of the lock. Fig. X is a similar view to Fig. VIII, with a loop on the lower edge of the lock.

Referring to the drawings, 1 represents the finished collar, and 2 and 3 represent the two sections that form the hames, and which I preferably construct of wood, but which may be of any other suitable material embodying strength and lightness of weight. The sections are connected at their upper ends by a suitable hinge 4, having its two parts joined by a pin 5, whose ends serve the additional service of holding a pad 6. (See Fig. I.) The hinge is composed of thin metal plates, formed with ribs 7, for the purpose of affording strength. 8 is a loop to which the back-band of the harness may be secured.

To allow of adjustment of the upper end of the collar, I provide a number of openings $4^a$ in the hinge 4, through either of which openings screws $4^b$ are inserted into the collar, the inner openings allowing of the lesser width and the outer openings allowing the greatest width of collar, thereby making the upper end of the collar adaptable for different animals.

Secured to the lower ends of the sections 2 and 3 are tubular pieces 9, that fit within locking-sections 10. The pieces 9 carry pins 11, held forward by coiled springs 12, and in the locking-sections are openings 13, in which the pins 11 are adapted to engage. There may be any desired number of the openings 13 into which the pins may fit, this arrangement being provided for the purpose of allowing the width of the lower end of the collar to be enlarged or lessened to accommodate it to the shoulders of different horses.

The locking-sections 10 are coupled together by a spring-pin 14, carrying a spring $14^a$, that is fitted to one of the sections and is arranged to be raised, so that when the two sections are brought together, the pin springs through an opening in a projection 15 on the opposite section, and from which said spring-pin is released by retracting it when it is desired to remove the collar.

In Figs. I, II, IV, VI, and IX, I have shown the spring-pin 14 provided with a finger-piece 16 in the front of the locking-sections, and in Fig. VIII, I have shown it with a loop 17 on its upper end, by which it may be retracted.

18 are straps secured to the rear of the sections 2 and 3 for the purpose of strengthening the upper ends of said sections.

19 are plates into which the terrets $19^a$ are screwed on, passing from the front of the sections 2 and 3, and 20 are plates into which the screws 21 that hold the draft-pieces 22 are inserted.

In Fig. IX is shown a ring 23 on the locking-section, and in Fig. X a loop 24, to either of which the collar-holding strap may be secured.

In finishing the collar, the sections 2 and 3 are covered with leather, and any suitable stuffing is inserted.

25 is a thin metal strip, secured to the face of the collar, to give finish to the appearance of the collar.

I claim as my invention—

A horse collar comprising two sections 2, 3, forming the hames, means for hinging the sections together at the top, the tubular pieces 9 secured to the lower ends of the sections, having pins 11, the coiled springs 12 pressing the pins forward, the locking sections 10, within which the tubular pieces fit, having a series of openings 13, with which the pins engage, locking pin 14 carrying a spring 14ª and securing the sections together, and means for retracting the locking pin, substantially as described.

CARL BLOCK.

In presence of—
C. G. EDWARDS,
G. E. EBERSOLE.